United States Patent [19]

Coggin, Jr.

[11] 3,982,915

[45] Sept. 28, 1976

[54] APPARATUS AND METHOD FOR CONTROLLING FLOODING IN THE DRAWING OF GLASS FIBERS

[76] Inventor: Charles H. Coggin, Jr., 1330 E. Foothill, Apt. 56, Glendora, Calif. 91740

[22] Filed: Dec. 8, 1975

[21] Appl. No.: 638,526

[52] U.S. Cl. ........................... 65/1; 65/2; 65/12; 264/169; 425/72 R
[51] Int. Cl.² ............... C03B 37/02; C03B 37/08
[58] Field of Search ............... 65/1, 2, 12, 16; 264/169; 425/72

[56] References Cited
UNITED STATES PATENTS

| | | | |
|---|---|---|---|
| 3,475,147 | 10/1969 | Stalego | 65/1 |
| 3,574,581 | 4/1971 | Strickland et al. | 65/1 |
| 3,859,070 | 1/1975 | Slonaker | 65/1 |
| 3,905,790 | 9/1975 | Strickland | 65/2 |
| 3,920,430 | 11/1975 | Corey | 65/1 |

*Primary Examiner*—Robert L. Lindsay, Jr.

[57] ABSTRACT

An orifice plate for use in a drawing assembly of the type wherein the plate has a flat undersurface devoid of nozzles, and bulk gas is directed toward the undersurfaces to cool fibers being drawn through the plate. The plate is characterized in that the orifices therein are arranged in sets with the orifices in the respective sets so spaced relative to one another that, in the event of the breakage of a fiber being drawn from one of the orifices of a set, the glass supplied to the orifice will flood to and join the other of the orifices in the set prior to flooding to the orifices of other sets.

16 Claims, 10 Drawing Figures

APPARATUS AND METHOD FOR CONTROLLING FLOODING IN THE DRAWING OF GLASS FIBERS

BACKGROUND OF THE INVENTION

The present invention relates to an improved apparatus and method for the drawing of glass fibers and is particularly concerned with such an apparatus wherein the orifice plate of the drawing bushing is of the type having a generally planar undersurface toward which bulk flow gas is directed to achieve fiber cooling and attenuation. The invention is especially directed to an improved orifice pattern which provides for "self-healing" in the event of the breakage of a fiber being drawn from the plate.

In its more specific aspects, the invention is concerned with an improvement in the apparatus disclosed in U.S. Pat. No. 3,905,790, granted Sept. 16, 1975, by Edward T. Strickland. That application discloses a method and apparatus for forming glass fibers wherein the orifice plate has a generally planar undersurface and bulk flow gas is directed upwardly toward the undersurface to effect fiber cooling and attenuation. It also suggests that self-correction of localized flooding can be achieved by close orifice spacing and discloses a technique of such self-correction wherein capillary grooves are provided between the orifices to provide a path for controlled glass flow from one orifice to another in the event of breakage of the fiber emanating from one of the orifices.

When glass defects (e.g., stones, crystalline particles, cords and seeds) pass through conventional tipped bushings, they generally cause fiber breakage. Then, the loose tail of the broken fiber either snaps out the rest of the fibers being drawn from the bushing, or else the drop that drains from the tip grows until it falls and breaks the other fibers. Either result causes an interruption of the fiber forming process.

When similar defects pass through a non-tip bushing using a column of rapidly moving cooling gas to maintain fiber separation, the fiber is similarly broken, but does not cause a snap-out of the other fibers. The drop left behind grows until it meets a cone of glass supplying a fiber being drawn from an adjacent orifice. It then, at times, causes a break of the fiber being drawn from the cone, which in turn floods to the next adjacent fiber, creating a "domino" effect that requires the operator's immediate attention.

In the preferred form of the non-tip bushing disclosed in aforementioned U.S. Patent, the inventor contemplates the provision of capillary grooves between the orifices in order to provide for controlled flooding in the event that a fiber breaks. The capillary grooves are designed to cause the plate to act as though it had controlled, but perfect, wetability. Since only a small volume of glass from the oozing orifice will first contact the neighbor fiber, the increase of acceleration load on the neighbor fiber will be gradual and, as the whole fiber pulls more glass out of the groove, the fiber cross-section enlarges and the fiber becomes stronger until a single larger fiber is fed by two orifices. Although the capillary grooves are effective in that they encourage more rapid flooding to selective adjacent orifices, they have some disadvantages. For example: they reduce the strength of the orifice plate; they affect the flow of electrical current, thus producing hot and cold spots; and, they increase plate fabrication costs.

SUMMARY OF THE INVENTION

The present invention contemplates a non-tip orifice plate wherein the orifices are arranged in paired sets, with the orifices within the respective sets being closely spaced to provide for controlled flooding therebetween, and the respective sets being spaced from one another by a distance greater than the distance between the orifices within the sets. The paired orifices within the sets are so spaced that in the event of the breakage of a fiber being drawn from one of the orifices, the glass from said one orifice floods to and joins the glass fiber being drawn from the orifice paired therewith before it has cooled to the extent where it would break out the fiber. The result is the formation of a single enlarged fiber fed by a "double cone" being drawn from the paired orifices. This enlarged fiber may be readily separated to provide a pair of fibers wherein each fiber again is fed by a single orifice. Separation may occur naturally or, if necessary, be achieved through the application of localized cooling gas.

A principal object of the present invention is to provide an orifice plate for a non-tip bushing wherein flooding may be readily controlled both during start-up of the bushing and in the event of fiber break out.

Another, and more specific, object of the invention is to provide such an orifice plate wherein the orifices are so arranged as to be self-corrective in the event of fiber break out.

Still another object of the invention is to provide such an orifice plate wherein the orifices are arranged in paired sets of two or three to provide for preferential flooding within the sets and avoid, or minimize, flooding from one set to another.

A further object of the invention is to provide such an orifice plate wherein the orifices are arranged in sets so spaced relative to one another that the bulk gas required for fiber attenuation is not restricted to the extent that so much gas must be used that it results in excessive cooling.

A further object of the invention is to provide such an orifice plate wherein the sets of orifices are arranged in groups, with the respective groups being spaced from one another by a distance greater than the sets of orifices within the groups so that the groups may be singled out during start-up.

Yet another object of the invention is to provide such an orifice plate wherein bulk gas is directed across the plate in one direction and electrical heating current is directed across the plate in another direction and the orifices are so arranged that maximum current path areas are provided where minimum gas flow occurs.

Still another object, related to the latter object, is to provide such an orifice plate wherein the direction of current flow and bulk gas flow are such that bulk gas flow is maximized between the orifices most closely spaced together and current flow is maximized between the orifices spaced most far apart.

The foregoing and other objects will become more apparent when viewed in light of the following detailed description and accompanying drawings.

DETAILED DESCRIPTION OF THE INVENTION

Figures 1, 2:
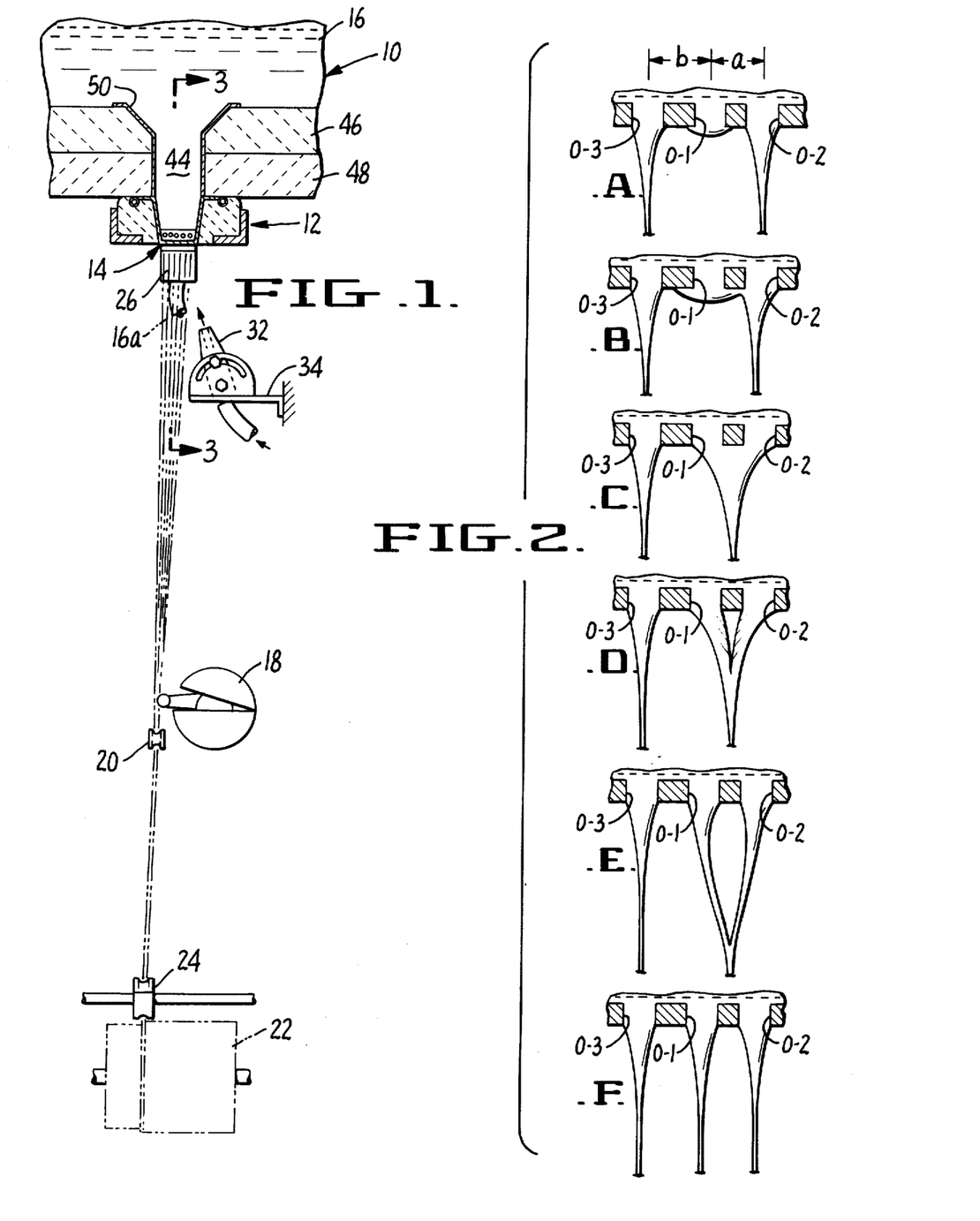
FIG. 1 is an elevational view, with parts thereof broken away, diagrammatically illustrating a drawing assembly incorporating the orifice plate of the present invention.
FIG. 2 is an enlarged cross-sectional view of a portion of an orifice plate constructed according to the present invention, sequentially illustrating the manner in which the paired orifices within the plate cooperate to achieve "self healing" in the event of flooding of one of the orifices.

Referring now to FIG. 1, the assembly there shown is of the same general type disclosed in my co-pending U.S. patent application Ser. No. 599,720, filed July 28, 1975. This type of assembly may be used with any of the embodiments of the present invention. It incorporates, as a principal component, a direct melt forehearth 10 beneath which a bushing assembly 12 is removably secured. The orifice plate to which the present invention is primarily directed is incorporated into the bushing assembly and designated by the numeral 14.

In the FIG. 1 assembly, the molten glass contained within the forehearth is designated by the numeral 16 and is shown being drawn through the orifice plate 14 into a plurality of fine monofilament fibers 16a. The fibers are drawn over a binder applicator 18 and gathering shoe 20, from whence they are directed to a collector and winding mechanism 22. A traverse 24 guides the fibers back and forth across the mechanism 22.

The glass within the bushing 12 is maintained at an elevated temperature by resistance heating the plate 14. The means for resistance heating the plate comprises a pair of terminals 26 and 28 secured to ears 30 integrally joined to opposite extremities of the plate. The ears and terminals are disposed to direct current lengthwise across the plate, as may be seen from FIGS. 3 and 4.

The glass fibers being drawn from the orifice plate 14 are cooled by bulk gas directed toward the undersurface of the plate through means of a nozzle 32. The gas, typically air, is directed across the width of the plate in a direction generally normal to the current flow direction (See FIG. 4). The nozzle 32 is mounted beneath and to one side of the orifice plate 14 through means of a bracket 34 provided with means to adjust the angle of the nozzle relative to the undersurface of the plate.

The orifice plate 14 is similar to that disclosed in my co-pending application Ser. No. 599,720, in that it is reinforced through means of an "egg crate" type of structure integrally joined to its inner surface. This structure comprises apertured ribs 36 extending transversely across the plate (as viewed in FIG. 4) and a perforated reinfocing plate, or screen, 38 of an area coextensive with the drawing area of the orifice plate, extending over the ribs in spaced parallel relationship to the upper surface of the orifice plate. The orifice plate, ribs and reinforcing screen are all fabricated of the same material (e.g., an alloy of 90% platinum and 10% rhodium) and are integrally joined.

The bushing assembly 12 also includes a lining 40 integrally joined to and extending upwardly from the orifice plate and a deflector plate 42 joined to the lining and extending generally across the supply flow passage, designated 44, leading to the bushing. The deflector plate 42 is of a peaked configuration and tends to deflect glass entering the bushing to the sides of the orifice plate. Perforations are provided in the deflector plate and these perforations, together with the screening perforations provided in the reinforcing plate 38, screen particles, such as refractory stones or crystals, from entry into the orifices of the orifice plate.

Figure 3:
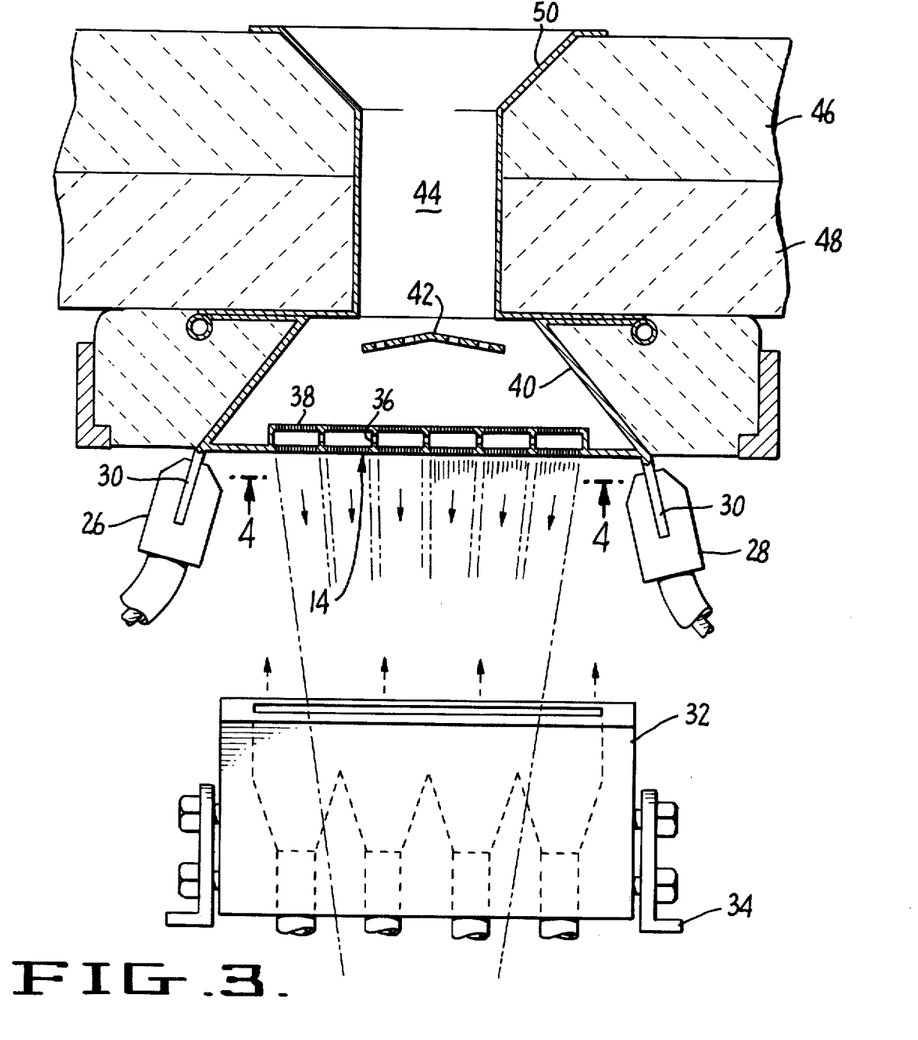
FIG. 3 is an enlarged cross-sectional elevational view, taken on plane 3—3 of FIG. 1.
Figure 4:
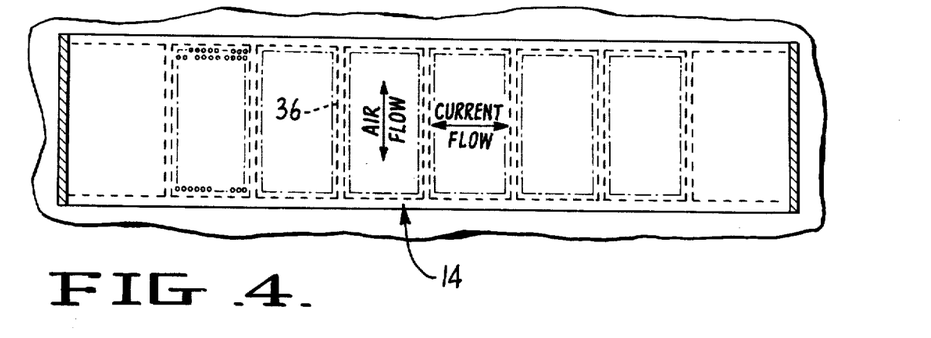
FIG. 4 is a diagrammatic plan view of the underside of the orifice plate of the invention, taken on the plane designated by line 4—4 in FIG. 3.

The flow block of the forehearth illustrated in FIGS. 1 and 3 corresponds to that disclosed in my copending application Ser. No. 599,720 and comprises an interior layer 46 fabricated of a highly heat and glass resistant material, such as zircon, and an exterior layer 48 fabricated of a material having high thermal shock resistant properties, such as MULLITE. The supply flow passage 44 extends through the interior and exterior layers and is lined with a platinum foil lining 50. The lining completely covers the flow passage and extends over the exterior peripheral surfaces surrounding the passage, as may be seen from FIG. 4.

The orifice plate of the present invention is characterized in that the orifices are arranged in paired sets wherein the orifices within the respective sets are close enough to one another that, in the event of the breakage of a glass fiber being drawn from one orifice of a set, the glass from said orifice will flow to and join the glass fiber being drawn from another orifice of the set prior to reaching any other orifices within the orifice plate or cooling to the extent that it no longer has sufficient wetability to join and merge with the fiber being drawn from the other orifice. It is also characterized in that the distance between the paired orifices within the sets, hereinafter referred to as dimension a, is sufficiently large that the fibers being drawn from the paired orifices within the sets will not coalesce under normal operating conditions (i.e., normal levels of bulk gas supply).

The dimension a is shown in FIG. 2 and in the three embodiments exemplified in the drawings (i.e., the embodiment of FIGS. 5 and 6, the embodiment of FIG. 7, and the embodiment of FIGS. 8 and 9), and is measured between the centers of the paired orifices within the sets. The drawings also show the following dimensions:

| Dimension | Description |
|---|---|
| "b" | The center-to-center distance between the sets of orifices within rows extending in |

| Dimension | Description |
|---|---|
| | the direction of current flow, as measured between adjacent orifices of the respective sets within the rows. |
| "c" | The center-to-center distance between the orifices of adjacent rows extending in the direction of current flow, as measured between adjacent orifices therein (i.e., normal to the direction of current flow). |
| "d" | The orifice diameter. |
| "e" | The center-to-center distance between adjacent groups of orifices, as measured between adjacent outermost orifices in the respective groups. (This dimension will not be present where the orifices are not arranged in groups-as, for example, with an orifice plate wherein the orifices are uniformly arranged as exemplified in the embodiment of FIG. 7.) |

The dimension $b$ is maintained larger than the dimension $a$ to assure that, in the event of the breakage of a fiber being drawn from an orifice, the flood resulting at that orifice will flow to and join the glass being drawn from the orifice paired thereto before it has the opportunity to reach an orifice of an adjacent set of orifices in the row within which the flooded orifice is located. This dimension is maintained as small as possible in order to maximize orifice density, but will always be greater than the dimension $a$.

The function of the dimensions $a$ and $b$ may best be appreciated by reference to the sequential illustration of FIG. 2. This figure is a cross-sectional view taken through a row of orifices extending in the direction of current flow and illustrates a paired set of orifices, designated O-1 and O-2, and one orifice designated O-3 of an adjacent set of orifices. In FIG. 2A, the orifice plate is shown in a condition wherein the fiber being drawn from the orifice O-1 has broken and the glass from the orifice is in the process of flooding radially therearound, but has not yet reached an adjacent orifice. FIG. 2B illustrates the condition wherein the glass from the orifice O-1 first reaches and joins the glass fiber being drawn from the orifice O-2. It will be noted that, due to the relative dimensions $a$ and $b$, the latter condition is achieved before the glass flooding from the orifice O-1 can reach the orifice O-3. FIG. 2C illustrates the next step in the progression after the condition illustrated in FIG. 2B and shows the glass from the orifice O-1 fully joined with that from the orifice O-2 to form a common enlarged fiber which is supplied with glass from both of the orifices. It will be noted that, in the latter condition, the glass from the orifice O-2 has been drawn away from the orifice O-3, as compared to the condition illustrated in FIG. 2B.

FIGS. 2D and 2E illustrate the manner in which the single enlarged fiber being drawn from the orifices O-1 and O-2, as depicted in FIG. 2C, bifurcates to "self heal" and return the orifices O-1 and O-2 to a condition wherein each orifice supplies a single fiber. FIG. 2F shows the final self-healed condition wherein the orifices O-1 and O-2 each supply but a single fiber.

It should be noted that, under ideal conditions, the sequential "self healing" process depicted in FIGS. 2A to 2F occurs automatically without operator assistance. Where operating conditions are difficult, or the operator wishes to speed the natural process, he might manually assist the separating process illustrated in FIGS. 2D, 2E and 2F by use of an air lance. It is also possible that an automatic air supply might be employed to facilitate the separation process.

The dimension $c$ is maintained larger than the dimension $b$ because the plate area between the orifices in the $c$ direction tends to be hotter and, thus, more prone to flooding, than the plate areas between the orifices in the $b$ direction. This results because there is increased current flow and decreased gas flow in the areas measured in the $c$ direction, as compared to those measured in the $b$ direction. It should be noted that current flows normal to the direction in which the $c$ dimension is measured and that bulk gas is directed generally normal to the direction in which the $b$ dimension is measured.

The relatively large expanses provided by the $e$ dimension between the groups or families of orifices permit clearing of separate areas of the orifice plate as the result of a non-flooded condition in these expanses. A "non-flooded" condition, as used herein, means a condition wherein the surface of the plate is not covered with glass. This clearing provision is very advantageous both during start-up operation and in the course of breaking up large floods which will not self correct.

The paired sets of orifices also facilitate clearing by permitting the formation of enlarged fibers supplied with glass from the two or three orifices within a set, as exemplified in FIG. 2C. Such enlarged fibers are known as "doublets" where they are provided with glass from two orifices within a paired set and "triplets" where they are supplied with glass from three orifices within a paired set. Examples of paired sets wherein each set comprises two orifices may be seen in the FIGS. 5 and 6 embodiment and the FIG. 7 embodiment. An example of a paired set wherein the set comprises three orifices may be seen in the FIG. 8 embodiment. The enlarged doublet or triplet fibers are advantageous during clearing and start-up in that these fibers are stronger than would be a fiber supplied from a single orifice (known as a "singlet") and, thus, more resistant to breakage by the high gas flow which is typically employed during clearing and start-up operations.

It should also be appreciated that the doublet or triplet fibers provided by the closely spaced orifices of the paired sets are ideally suited for separation into singlet fibers because of the relatively close spacing of the orifices within the sets. Where the spacing between orifices is relatively large, as, for example, measured in the $c$ or $e$ dimensions, and a doublet or triplet fiber is created between such orifices, it becomes difficult, if not impossible, to cleanly separate the fiber into singlet fibers.

The advantages of the present invention are evident throughout all of the operating conditions encountered during the drawing of glass fibers.

At start-up, the invention enables the operator to clear the plate in an orderly and systematic manner. The sequence of operations during start-up is generally as follows:

1. The plate is initially in a completely flooded condition with molten glass covering its undersurface.

2. The operator breaks the flood into family groups (i.e., small floods) wherein the groups are separated by the spacing provided by the group spacing dimension $e$.

3. The operator breaks the family groups down, generally in one-at-a-time fashion, into doublets and singlets.

4. The operator breaks the doublets into singlets.

5. Steps 3 and 4 are carried out on each family group until the entire orifice plate is cleared and one fiber emanates from each orifice within the plate.

The same general steps are used to correct the partial flood, with the number of steps required being dependent upon the extent of the flood.

During normal operation, in the event of fiber breakage, the breakage ideally self corrects through the sequence depicted in FIG. 2. Where, for some reason, complete self-correction does not occur, partial self correction to the extent shown in FIG. 2C will generally take place. The latter condition results in the formation of doublets or triplets and effectively halts continued flooding.

Figure 7:
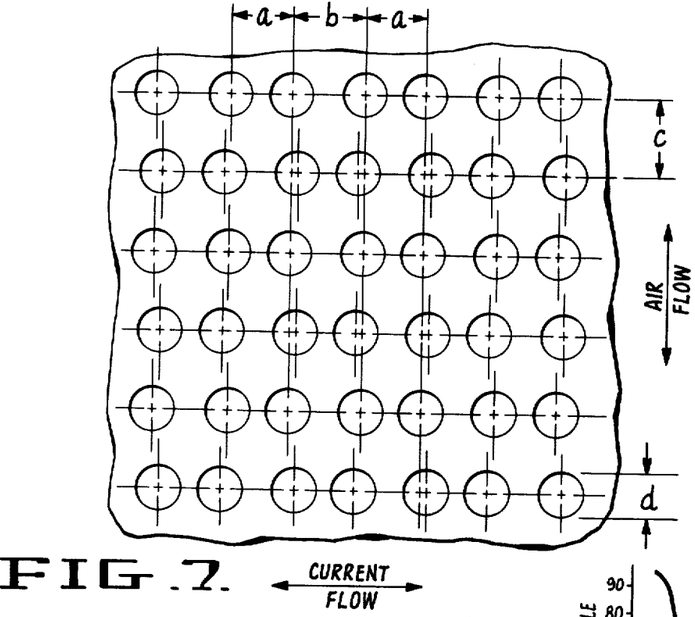
FIG. 7 is an enlarged plan view of a portion of the underside of a second embodiment of the inventive orifice plate.

The orifice size and spacing employed in the present invention depends upon the throughput desired. The following tables give examples for three different output ranges:

The FIG. 7 embodiment also employs an orifice pattern wherein two orifices are provided in each paired set. The sets are arranged in rows spaced by the dimension $c$ and the sets within the rows are spaced by the dimension $b$. As illustrated, however, the orifices of the FIG. 7 embodiment are not arranged in groups spaced by the dimension $e$. If grouping is desired, such an arrangement might be provided with the FIG. 7 embodiment by simply arranging the orifices in rectangular groups and spacing the groups by the dimension $e$.

Figure 9:
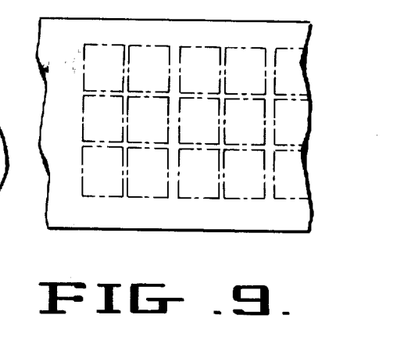
FIG. 9 is a bottom plan view of a portion of an orifice plate embodying the third embodiment of the invention, schematically illustrating the arrangement of a plurality of groups of orifices corresponding to the group circumscribed by the phantom line in FIG. 8; and, FIG. 10 is a curve plotting glass equilibrium contact angle versus temperature for glass typical of that with which the present invention is used.

In the embodiment of the invention illustrated in FIG. 9, the paired sets each comprise three orifices and the sets are arranged in rows wherein the sets within the rows are spaced by the dimension $b$ and the rows are spaced from one another by the dimension $c$. The orifices within the sets are spaced by the dimension $a$ and, thus, provide for the formation of "triplets".

The portion embraced within the phantom line in

I

| "d" | Orifice Throughput of 0.2-0.3 Grams/Orifice/Minute | | | | | | | |
|---|---|---|---|---|---|---|---|---|
| | "a" 1.20d–1.30d | | "b" 1.40d–1.50d | | "c" 1.55d–1.65d | | "e" 1.65d–1.75 | |
| .037 | .044 | .048 | .052 | .056 | .057 | .061 | .061 | .065 |
| .040 | .048 | .052 | .056 | .060 | .062 | .066 | .066 | .070 |
| .042 | .050 | .055 | .059 | .063 | .065 | .069 | .069 | .074 |

II

| "d" | Orifice Throughput of 0.3-0.5 Grams/Orifice/Minute | | | | | | | |
|---|---|---|---|---|---|---|---|---|
| | "a" 1.25d–1.35d | | "b" 1.400–1.50d | | "c" 1.55d–1.65d | | "e" 1.65d–1.75d | |
| .045 | .056 | .061 | .063 | .068 | .070 | .074 | .074 | .079 |
| .047 | .059 | .063 | .066 | .071 | .073 | .078 | .078 | .082 |
| .050 | .062 | .067 | .070 | .075 | .078 | .083 | .083 | .088 |
| .052 | .065 | .070 | .073 | .078 | .081 | .086 | .086 | .091 |

III

| "d" | Orifice Throughput of 0.5-0.7 Grams/Orifice/Minute | | | | | | | |
|---|---|---|---|---|---|---|---|---|
| | "a" 1.30d–1.45d | | "b" 1.45d–1.55d | | "c" 1.60d–1.70d | | "e" 1.70d–1.80d | |
| .054 | .070 | .078 | .078 | .084 | .086 | .092 | .092 | .097 |
| .056 | .073 | .081 | .081 | .087 | .090 | .095 | .095 | .097 |
| .058 | .075 | .084 | .084 | .090 | .093 | .099 | .099 | .104 |
| .060 | .078 | .087 | .087 | .093 | .096 | .102 | .102 | .108 |

The particular orifice pattern employed in the present invention may vary considerably, as exemplified by the differences between the three embodiments illustrated.

Figures 5, 6:
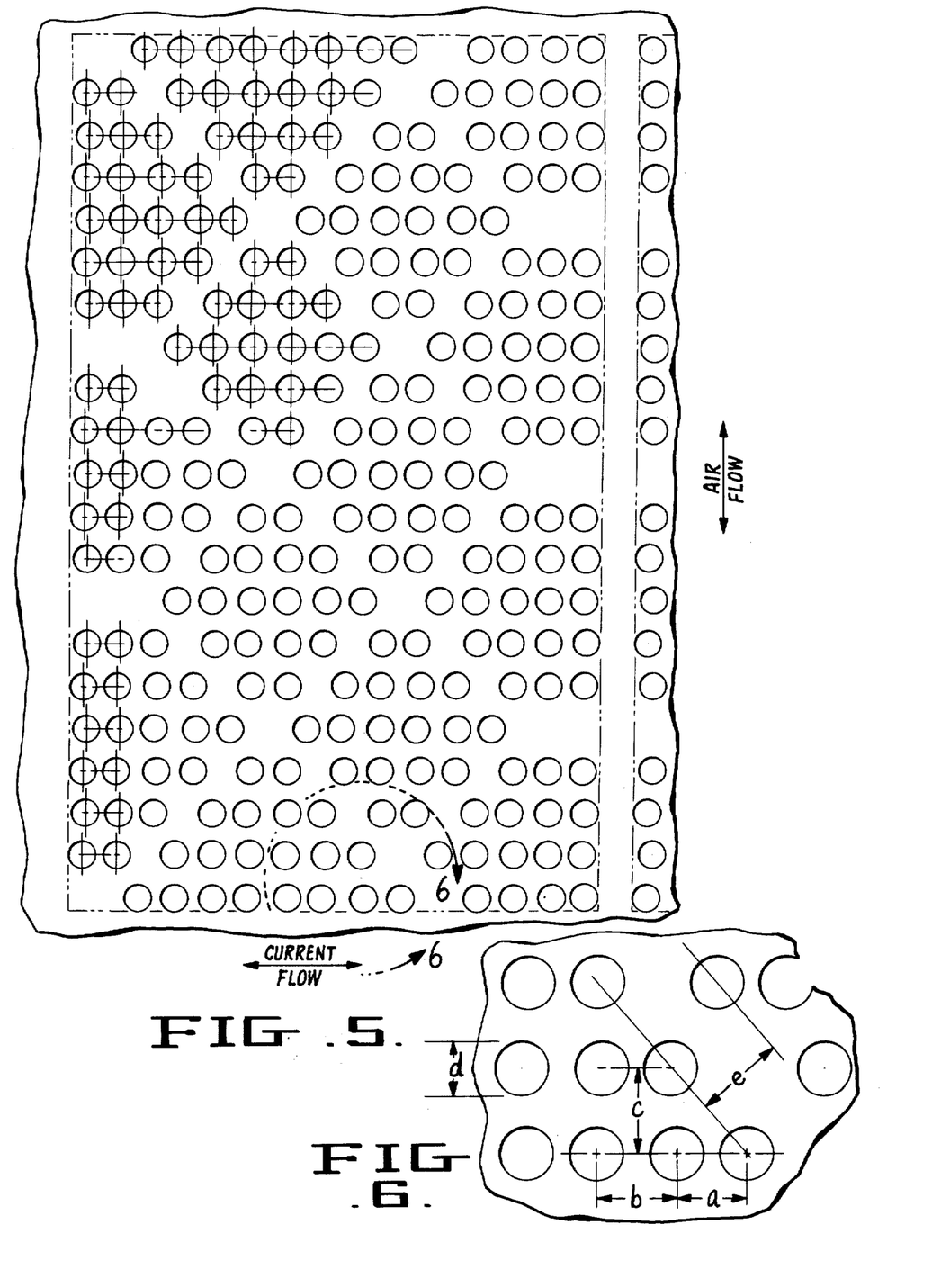
FIG. 5 is an enlarged plan view of the underside of a segment of a first embodiment of the inventive orifice plate.
FIG. 6 is an enlarged plan view of the underside of that portion of the first embodiment circumscribed within line 6—6 of FIG. 5.

In the first embodiment, illustrated in FIGS. 5 and 6, the orifices are arranged in generally diamond shaped groups, with each group comprising a plurality of rows of orifices, each row of which comprises at least one paired set. The sets in the FIGS. 5 and 6 embodiment each comprise two orifices and, thus, in the event of flooding of an orifice, self correction takes place as the result of the formation of a doublet. Those areas of FIG. 5 embraced within the phantom lines depict segments of the orifice plate corresponding to the segments shown in the composite plate illustrated in FIG. 4. The plate comprises a plurality of such segments and the respective segments are spaced from one another by a distance greater than the dimension $e$. In the preferred arrangement, the reinforcing ribs (36) for the plate are disposed so as to be between the segments.

Figure 8:
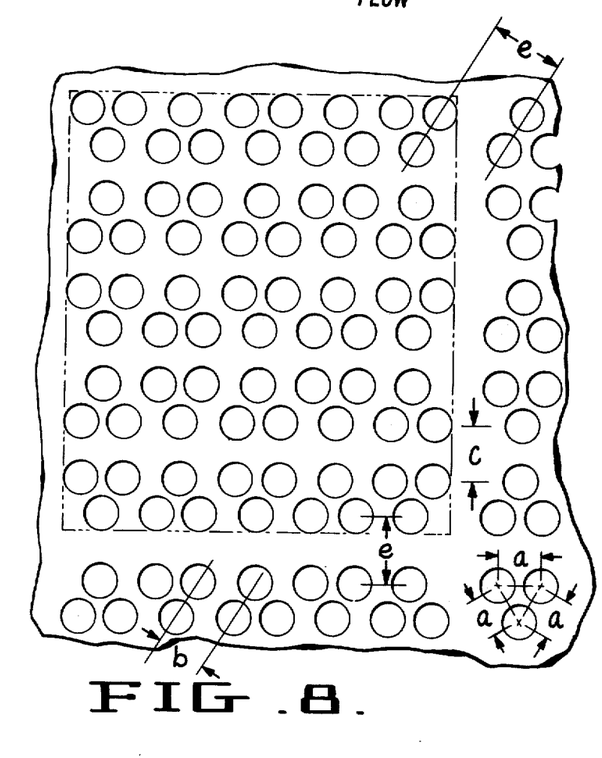
FIG. 8 is an enlarged plan view of a portion of the underside of a third embodiment of the inventive orifice plate.

FIG. 8 comprises one group and the manner in which a plurality of such groups would be arranged in a composite orifice plate is shown in FIG. 9. As there shown, six groups are included in the area which would be disposed between each pair of reinforcing ribs (36) of the orifice plate.

The foregoing examples assume a wetability between the plate and molten glass wherein the equilibrium contact angle is between 30° and 40°. This is the included angle between the undersurface of the orifice plate and a tangent to the liquid drop of glass which forms on the orifice plate when an orifice floods. Complete wetting occurs when the contact angle is zero. No wetting occurs when the contact angle is higher than 90°.

Figure 10:
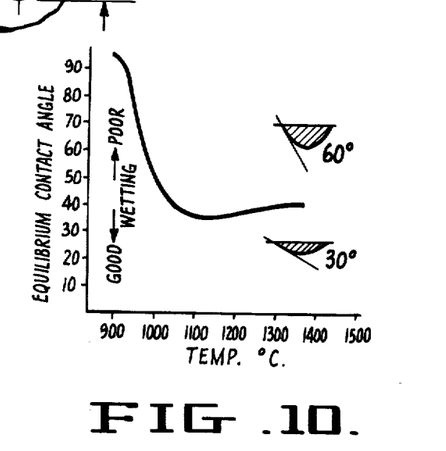

FIG. 10 is an equilibrium contact angle curve for type E glass on an orifice plate of 90 percent platinum, 10 percent rhodium, alloy. The two cross-sections shown in the figure depict wetting angles of 30° and 60°, respectively. The curve shows that maximum wetability occurs between about 1,050° and 1,150° centigrade. Temperatures in this range and of up to around 1,300° centigrade are typical of those used in glass drawing processes.

Although the foregoing description and the examples therein have been concerned with glass, it should be understood that the invention is not necessarily limited to use with glass. The process and apparatus disclosed herein can also be used in the manufacture of ceramic fibers which have processing properties similar to glass. These may include fibers containing various metal oxides, for example alumina borosilicate, alumina silica, zirconia-silica, and the like. The bushing and the orifice plate, of course, should be made of an alloy or other material capable of withstanding the elevated temperatures of the various types of ceramic material which can be formed into fiber.

The invention is not intended to be limited to the specifics of the afore-described embodiments, but rather is defined by the following claims.

What is claimed is:

1. In a glass fiber drawing assembly of the type comprising a non-tip orifice plate with a drawing area having a flat undersurface through which fibers are drawn, a collet for drawing glass fibers from the plate, a supply nozzle for directing bulk gas against the undersurface of the plate and current supply means to direct current through the plate to effect the resistance heating thereof, an improved orifice plate for use in the assembly, said plate comprising: a drawing area having a plurality of drawing orifices extending therethrough and a flat undersurface through which said orifices open, said orifices being arranged in paired sets spaced from one another by a distance greater than the distance between the orifices within the sets and wherein the orifices within the respective sets are so spaced relative to one another that, in the event of the breakage of a fiber being drawn from one of the orifices of a set, the glass supplied to said one orifice will flood to and join the glass being drawn from the other of the orifices in said set prior to flooding to the orifices of other of said sets.

2. In a combination according to claim 1, the improved orifice plate wherein the orifices in said paired sets of orifices are substantially the same diameter and spaced from one another by a center-to-center distance equal to 1.20 to 1.45 times said diameter.

3. In a combination according to claim 1, the improved orifice plate wherein at least some of the sets are arranged in generally parallel adjacent rows, and adjacent rows are spaced from one another by a distance greater than the distance between the sets of orifices within the rows.

4. In a combination according to claim 3, the improved orifice plate wherein the orifices in adjacent rows are of substantially the same diameter and adjacent rows are spaced from one another, as measured between adjacent orifices therein, by a center-to-center distance equal to from 1.55 to 1.70 times said diameter.

5. In a combination according to claim 3, the improved orifice plate wherein the orifices within each row are of substantially the same diameter and the sets within the rows are spaced from one another, as measured between adjacent orifices therein, by a center-to-center distance equal to from 1.40 to 1.55 times said diameter.

6. In a combination according to claim 1, wherein the current supply means is disposed to direct current across the orifice plate in a first direction, the improved orifice plate wherein the orifices are arranged in rows extending across the plate in generally parallel relationship to one another and said first direction, said rows being spaced from one another by a distance greater than the distance between the orifices within the paired sets.

7. In a combination according to claim 6, the improved orifice plate wherein the orifices in adjacent rows are of substantially the same diameter and adjacent rows are spaced from one another, as measured between adjacent orifices therein, by a center-to-center distance equal to from 1.55 to 1.70 times said diameter.

8. In a combination according to claim 6, wherein the supply nozzle is disposed to direct gas across the orifice plate in a second direction, the improved orifice plate wherein at least some of the rows of orifices comprise a plurality of said paired sets and adjacent paired sets within each such row are spaced from one another in a direction generally normal to said second direction and by a distance greater than the distance between the orifices within the sets.

9. In a combination according to claim 8, the improved orifice plate wherein the orifices are within the respective rows of substantially the same diameter and the adjacent paired sets within the rows are spaced from one another by a center-to-center distance, as measured between adjacent orifices therein, equal to from 1.40 to 1.55 times said diameter.

10. In a combination according to claim 1, the improved orifice plate wherein the orifices are arranged in groups with a plurality of sets of orifices within each group and the respective groups are spaced from one another by a distance greater than the distance between the orifices within the groups.

11. In a combination according to claim 10, the improved orifice plate wherein the orifices are all of substantially the same diameter and the groups are spaced by a distance, as measured between adjacent outermost orifices in the respective groups, at least equal to 1.65 times said diameter.

12. A method of controlling flooding from a first orifice of a glass fiber drawing apparatus of the type having a non-tip plate with a flat undersurface through which the orifice extends and against which bulk gas is directed to cool fiber being drawn from the orifice, said method comprising extending a second orifice through said plate in paired relationship to the first orifice and so positioned relative thereto that in the event of breakage of a glass fiber being drawn from the first orifice the glass therefrom will flood to and join glass being drawn from the second orifice prior to flooding to any other orifices within the plate or cooling sufficiently to prevent the continued drawing of the glass from the first orifice.

13. A method, according to claim 12, wherein the second orifice is substantially the same diameter as the first orifice and spaced therefrom by a distance equal to from 1.20 to 1.45 times said diameter.

14. In a glass fiber drawing assembly of the type comprising a non-tip orifice plate with a drawing area having a flat undersurface through which fibers are drawn, a collet for drawing glass fibers from the plate, a supply nozzle for directing bulk gas against the undersurface of the plate and current supply means to direct current through the plate to effect the resistance heating thereof, an improved orifice plate for use in the assembly, said plate comprising: a drawing area having a plurality of drawing orifices extending therethrough and a flat undersurface through which said orifices open, said orifices being arranged in paired sets spaced from one another by a distance greater than the distance between the orifices within the sets and wherein the orifices within the respective sets are so spaced relative to one another that a single enlarged fiber can be drawn from the plural orifices within a set during clearing of the plate and wherein the respective sets are so spaced relative to one another that enlarged fibers so formed may be maintained separately from one another and, ultimately, separated into multiple fibers wherein each fiber is supplied with glass from but a single orifice.

15. In a combination according to claim 14, the improved orifice plate wherein at least some of the sets are arranged in generally parallel adjacent rows, and adjacent rows are spaced from one another by a distance greater than the distance between the sets of orifices within the rows.

16. In a combination according to claim 14, the improved orifice plate wherein the orifices are arranged in groups with a plurality of sets of orifices within each group and the respective groups are spaced from one another by a distance greater than the distance between the orifices within the groups whereby each groups may be separately cleared.

* * * * *